Nov. 8, 1966     G. MADELUNG     3,284,030
ENGINE ARRANGEMENT FOR SHORT TAKE OFF AIRCRAFT
Filed Feb. 24, 1965     2 Sheets-Sheet 1

INVENTOR
Gero Madelung
BY
ATTORNEY

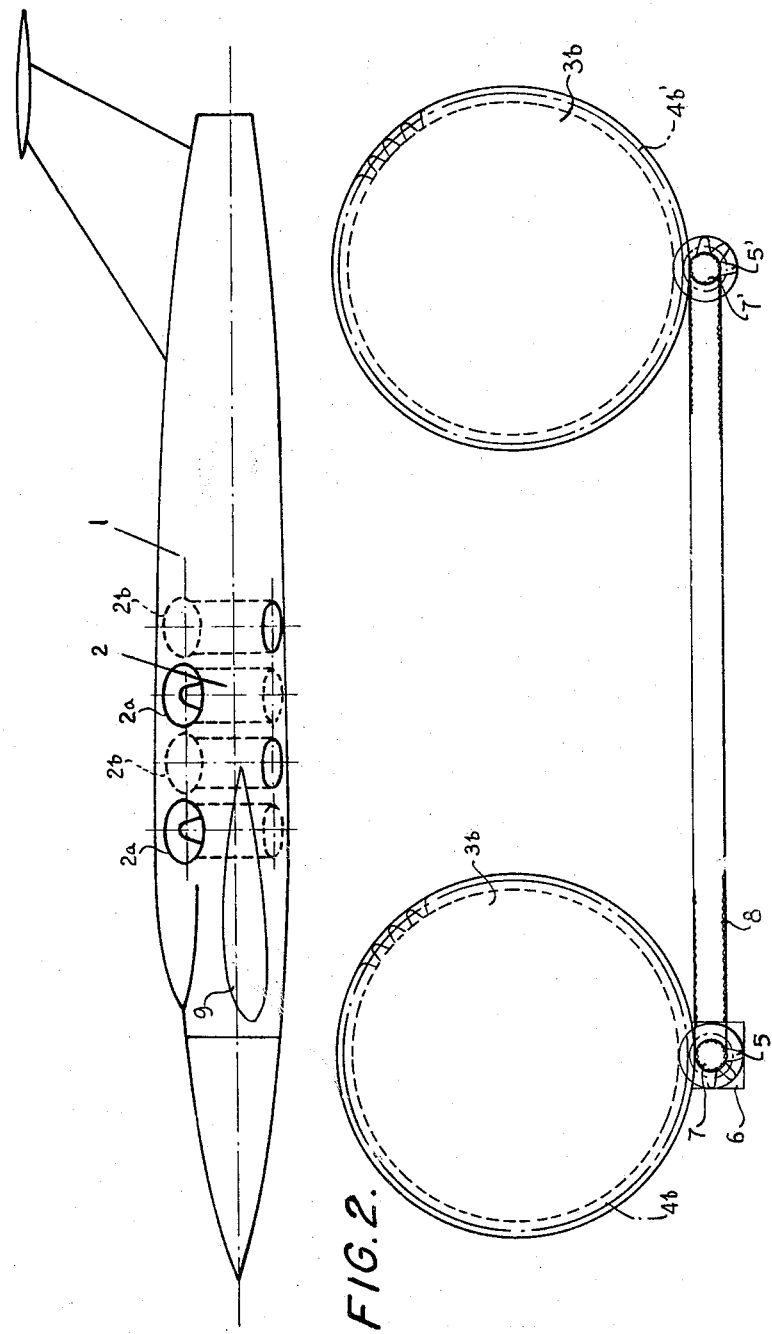

United States Patent Office 3,284,030
Patented Nov. 8, 1966

3,284,030
ENGINE ARRANGEMENT FOR SHORT
TAKE OFF AIRCRAFT
Gero Madelung, Munich, Germany, assignor to
Messerschmitt A.G., Augsburg, Germany
Filed Feb. 24, 1965, Ser. No. 434,996
Claims priority, application Germany, Feb. 26, 1964
M 60,066
20 Claims. (Cl. 244—56)

The present invention relates to a jet engine arrangement for short take off aircraft or vertical take off aircraft, and more particularly to a jet engine arrangement with turnable deflector nozzles permitting a change of the direction of the stream of gases discharged by the exhausts of the jet engines.

Vertical take off, or short take off aircraft is known in which in addition to the main engine which propel the aircraft, auxiliary engines are provided for producing a vertical lifting force.

The auxiliary lifting engines are mounted either in the fuselage, or in nacelles disposed on the fuselage or on the wings. The lifting engines are usually arranged in substantially vertical position so that a vertical lifting force is produced during take off, and it is known to provide deflectors for deflecting the stream of gases discharged by jet engines whereby the direction of the thrust produced by the lifting jet engines can be varied.

Known constructions of this type permit only a small variation of the angle of the discharged jet stream, since a substantial deflection of the jet stream discharged by vertically arranged jet engines causes very great difficulties due to the necessary constructive and fluid dynamic considerations.

It is one object of the invention to overcome the disadvantages of known jet engine arrangements for providing a lifting force during the take off of an aircraft, and to provide a jet engine arrangement of simple construction producing symmetrical lifting forces on opposite sides of an aircraft.

Another object of the invention is to provide a jet engine arrangement which is provided with deflector nozzles for selectively producing a downwardly directed lifting thrust and a rearwardly directed propelling thrust.

Another object of the invention is to provide an aircraft with pairs of jet engines whose axes are inclined to each other and to vertical and horizontal planes.

Another object of the invention is to provide two rows of slanted jet engines in an aircraft, and to control the direction of the discharged jet streams independently for each row of jet engines.

With these objects in view, the present invention relates to an aircraft having at least one pair of jet engines mounted thereon in angularly displaced positions for discharging jet streams in angular displaced directions. Each engine is disposed in a plane transverse to the longitudinal axis of the aircraft, and has an exhaust tube inclined to vertical and horizontal planes and carrying a turnable deflector nozzle which is operable to direct the discharged jet stream in downward direction for producing a lifting force, or rearwardly to produce a propelling force. In intermediate positions of the deflector nozzles, lifting and propelling forces are simultaneously produced.

In the preferred embodiment of the invention, two rows of jet engines are provided. The axes of the jet engines of each row are located in two intersecting planes passing through the longitudinal axis of the aircraft and alternate jet engines of the two rows are located in parallel planes perpendicular to the longitudinal axis of the aircraft. Consequently, the exhaust tubes of the two rows of engines form two rows on opposite sides of the aircraft.

Deflector nozzles are mounted on the exhaust tubes and are curved at substantially the same angle as the axes of the jet engines are inclined to the vertical plane of symmetry of the aircraft. Consequently, turning of the deflector nozzles permits it to direct the thrust in exactly vertical direction for lifting purposes, and in a horizontal direction parallel to the longitudinal axis of the aircraft for propelling purposes.

In the preferred embodiment of the invention, the deflector nozzles of each row of jet engines can be simultaneously turned independently of the deflector nozzles of the respective other row which increases the maneuverability of the aircraft.

The downwardly directed vertical thrust will produce a vertical, or almost vertical take off, and when the jet thrust is gradually inclined to the vertical by turning the deflector nozzles of both rows of engines, a propelling component develops which moves the aircraft in forward direction so that the wings of the aircraft produce a lifting force.

During the starting period of the jet engines, a downwardly directed jet stream is undesired, and consequently it is advantageous to start the jet engines in positions of deflector nozzles in which the jet streams are discharged in horizontal direction, and when the engines have developed full force, the nozzles are turned to produce a vertical downward directed thrust for the take off of the aircraft.

It is also possible to use the main engines of the aircraft for a conventional take off, and to assist the forward propulsion produced by the main engines by turning the deflector nozzles to the position producing a horizontal rearwardly directed thrust to augment the thrust developed by the main engines.

When only one row of engines is used for producing a horizontal rearwardly directed thrust, the aircraft can be turned about its vertical axis, and by independently setting the deflector nozzles on opposite sides of the aircraft to the different positions, various turns and maneuvers can be rapidly performed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a fragmentary sectional view taken on line A-B in FIG. 1; and

FIG. 3 is a schematic side elevation of an aircraft provided with the jet engine arrangement of the invention.

Figure 1:
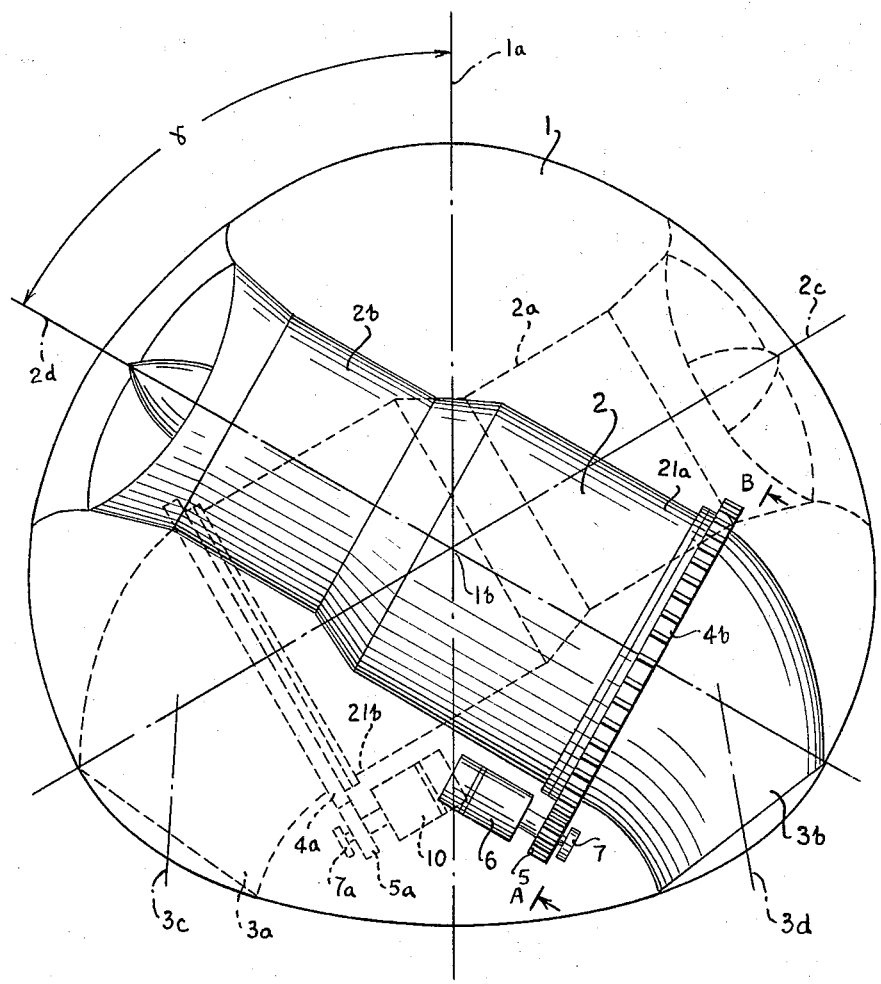
FIG. 1 is a schematic cross-sectional view of the aircraft shown in FIG. 3.

Referring now to the drawings, two pairs of angularly displaced jet engines 2 are mounted in the fuselage 1 of the aircraft which has lateral wings 3. Alternate engines 2a and 2b have axes 2c and 2d, respectively, which are located in two planes intersecting in the vertical plane of symmetry of the fuselage and aircraft, and more particularly in the longitudinal axis 1b of the same. The planes and axes 2c, 2d define the same angle γ with the vertical plane of symmetry 1a, the angle being preferably between 45 and 60 degrees.

Each engine 2a and 2b respectively, has a tubular exhaust 21a and 21b respectively, on which deflector nozzles 3a and 3b are mounted for turning movement about the respective axis 2c, 2d.

Each deflector nozzle has a mounting portion surrounding the respective exhaust tube, and is curved to terminate in a discharge portion 3a, 3b.

The axes 3c, 3d of the discharge portions also define the same angle γ with the axes 2c, 2d so that in the position illustrated in FIG. 1, the jet streams discharged from the exhaust tubes 21a, 21b are deflected to be discharged downward in a substantially vertical direction.

Gears 4a and 4b are respectively secured to the mounting portions of the deflector nozzles 3a and 3b of the first pair of jet engines 2a, 2b. The deflector nozzles of the second rearwardly located pair of jet engines 2a and 2b have corresponding gears, of which only the gear 4'b papears in the fragmentary section of FIG. 2 together with gear 4b.

Each gear meshes with a pinion 5, 5', respectively, which is mounted on a shaft carrying a chain sprocket 7, 7'. Only the shaft of pinion 5 is driven by a motor 6, and a chain 8 transmits the turning movement of chain sprocket 7 to the chain sprocket 7' and to pinion 5'. Consequently, when motor 6 is energized by actuation of a switch, not shown, the nozzles 3b located on one side of the aircraft are turned about the axes 2d from the illustrated position to a position in which the axes 3c and 3d of the discharge portions thereof are located in a horizontal plane so that the jet streams are discharged from the nozzles in rearward direction for producing a propelling force.

The deflector nozzles 3a on the other side of the aircraft are operated in the same manner. A pinion 5a meshes with the gear 4a of the foremost engine 2a and is driven by an electric motor 10. A sprocket 7a is connected by a chain to a sprocket secured to a pinion driving the gear on the deflecting nozzle of the rearwardly located jet engine 2a. Consequently, the pilot can operate the deflector nozzles of each of the two rows of nozzles which are located on opposite sides of the aircraft which permits a turning of the aircraft about a vertical axis.

When both motors are simultaneously energized, the nozzles first produce a vertical lifting force, and when they are gradually turned, the thrusts have vertical and horizontal components, and finally the nozzles are in positions in which all jet streams discharged by the same produce only propelling forces, while lateral forces are counterbalanced by the symmetrical arrangement of the nozzles in relation to the vertical plane of symmetry.

It is also possible to turn the deflector nozzles in the opposite direction to produce a forwardly directed downwardly inclined thrust so that the aircraft is braked.

In the illustrated embodiment, the jet engines and deflector nozzles are arranged in the fuselage of the aircraft. However, the jet engines can be arranged in the same manner in a nacelle or in nacelles, mounted on the wings or on the fuselage of the aircraft.

It will be understood that each of the elements described above, or two or more together, may also find a useful application in other types of jet engine arrangements for producing a lifting force differing from the types described above.

While the invention has been illustrated and described as embodied in a jet engine arrangement including two rows of jet engines located in planes perpendicular to the axis of an aircraft and having turnable deflector nozzles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In combination with an aircraft part having a longitudinal axis, at least one pair of jet engines mounted on said aircraft part in angularly displaced positions for discharging jet streams in two angularity spaced directions, each engine being disposed in a plane inclined to said longitudinal axis; and at least one pair of deflecting nozzle means each associated with one of said pair of jet engines and movable between a lifting position substantially vertically downwardly deflecting the jet streams and a propelling position substantially horizontally rearwardly deflecting said streams, so that the substantially horizontally rearwardly deflected jet streams provide the sole means of propulsion in horizontal direction.

2. In combination with an aircraft part having a longitudinal axis, at least one pair of jet engines mounted on said aircraft part, said jet engines having angularly spaced axes defining angles with a vertical plane through said longitudinal axis so that jet streams are discharged by said engines on opposite sides of said aircraft part at angles to a horizontal plane whereby the jet streams have components for lifting the aircraft; and at least one pair of deflecting nozzle means each associated with one of said pair of jet engines and movable between a lifting position substantially vertically downwardly deflecting the jet streams and a propelling position substantially horizontally rearwardly deflecting said streams, so that the substantially horizontally rearwardly deflected jet streams provide the sole means of propulsion in horizontal direction.

3. In combination with an aircraft part having longitudinal axis, at least one pair of jet engines mounted on said aircraft part, said jet engines having angularly spaced axes defining equal angles with a vertical plane passing through said longitudinal axis so that jet streams are discharged by said engines on opposite sides of said aircraft part at angles to a horizontal plane whereby the jet streams have components for lifting the aircraft; and at least one pair of deflecting nozzle means each associated with one of said pair of jet engines and movable between a lifting position substantially vertically downwardly deflecting the jet streams and a propelling position substantially horizontally rearwardly deflecting said streams, so that the substantially horizontally rearwardly deflected jet streams provide the sole means of propulsion in horizontal direction.

4. In combination with an aircraft part having a longitudinal axis, at least one pair of jet engines mounted on said aircraft part, said jet engines having angularly spaced axes defining angles with a vertical plane passing through said longitudinal axis so that jet streams are discharged by said engines on opposite sides of said aircraft part at angles to a horizontal plane whereby the jet streams have components for lifting the aircraft, said axes of said jet engines being located in parallel planes which are perpendicular to said longitudinal axis; and at least one pair of deflecting nozzle means each associated with one of said pair of jet engines and movable between a lifting position substantially vertically downwardly deflecting the jet streams and a propelling position substantially horizontally rearwardly deflecting said streams, so that the substantially horizontally rearwardly deflected jet streams provide the sole means of propulsion in horizontal direction.

5. In combination with an aircraft part having a longitudinal axis, at least one pair of jet engines mounted on said aircraft part, said jet engines having angularly spaced axes defining angles between 45° and 60° with a vertical plane through said longitudinal axis so that jet streams are discharged by said engines on opposite sides of said aircraft part at angles to a horizontal plane whereby the jet streams have components for lifting the aircraft; and at least one pair of deflecting nozzle means each associated with one of said pair of jet engines and movable between a lifting position substantially vertically downwardly deflecting the jet streams and a propelling position substantially horizontally rearwardly deflecting said streams, so that the substantially horizontally rearwardly deflected jet streams provide the sole means of propulsion in horizontal direction.

6. In combination with an aircraft part having a longitudinal axis, at least one pair of jet engines mounted on said aircraft part, said jet engines having angularly spaced axes defining equal angles with a vertical plane passing through said longitudinal axis so that jet streams are discharged by said engines on opposite sides of said aircraft part at angles to a horizontal plane whereby the jet streams have components for lifting the aircraft, said axes of said jet engines being located in parallel planes which are perpendicular to said longitudinal axis; and at least one pair of deflecting nozzle means each associated with one of said pair of jet engines and movable between a lifting position substantially vertically downwardly deflecting the jet streams and a propelling position substantially horizontally rearwardly deflecting said streams, so that the substantially horizontally rearwardly deflected jet streams provide the sole means of propulsion in horizontal direction.

7. In combination with an aircraft part having a longitudinal axis, at least one pair of jet engines mounted on said aircraft part, said jet engines having angularly spaced axes defining equal angles between 45° and 60° with a vertical plane passing through said longitudinal axis so that jet streams are discharged by said engines on opposite sides of said aircraft part at angles to a horizontal plane whereby the jet streams have components for lifting the aircraft, said axes of said jet engines being located in parallel planes which are perpendicular to said longitudinal axis; and at least one pair of deflecting nozzle means each associated with one of said pair of jet engines and movable between a lifting position substantially vertically downwardly deflecting the jet streams and a propelling position substantially horizontally rearwardly deflecting said streams, so that the substantially horizontally rearwardly deflected jet streams provide the sole means of propulsion in horizontal direction.

8. In combination with an aircraft part having a longitudinal axis, at least one pair of jet engines mounted on said aircraft part and having angularly spaced axes defining equal angles with the vertical symmetrical plane through said longitudinal axis and being located in planes inclined to said longitudinal axis and including tubular exhaust means located on opposite sides of said plane of symmetry; and deflector nozzle means mounted on each of said exhaust means for turning movement between a lifting position for downwardly deflecting the jet streams discharged by said exhaust means and a propelling position for rearwardly deflecting said streams, so that the substantially horizontally rearwardly deflected jet streams provide the sole means of propulsion in horizontal direction.

9. In combination with an aircraft part, at least one pair of jet engines mounted on said aircraft part and having angularly spaced axes defining equal angles with the vertical plane of symmetry of the aircraft part, and including tubular exhaust means located on opposite sides of said plane of symmetry coaxial with said axes of said jet engines, respectively; curved deflector nozzle means mounted on each of said exhaust means for turning movement between a lifting position for downwardly deflecting the jet streams discharged by said exhaust means and a propelling position for rearwardly deflecting said streams, each deflector nozzle means having a mounting portion engaged with said exhaust means and a discharge portion extending at an angle to said mounting portion; and operating means for turning said nozzle means, so that the substantially horizontally rearwardly deflected jet streams provide the sole means of propulsion in horizontal direction.

10. In combination with an aircraft part, at least one pair of jet engines mounted on said aircraft part and having angularly spaced axes defining equal angles with the vertical plane of symmetry of the aircraft part, and including tubular exhaust means located on opposite sides of said plane of symmetry coaxial with said axes of said jet engines, respectively; curved deflector nozzle means mounted on each of said exhaust means for turning movement between a lifting position for downwardly deflecting the jet streams discharged by said exhaust means and a propelling position for rearwardly deflecting said streams, each deflector nozzle means having a mounting portion engaged with said exhaust means and a discharge portion extending at an angle to said mounting portion, said last-mentioned angle being substantially equal to said first-mentioned angles so that the jet streams are discharged from said discharge portions in vertical directions in said lifting position, and in horizontal direction in said propelling position; and operating means for turning each of said nozzle means independently of the other nozzle means, so that the substantially horizontally rearwardly deflected jet streams provide the sole means of propulsion in horizontal direction.

11. In combination with an aircraft part having a longitudinal axis, at least one pair of jet engines mounted on said aircraft part and having angularly spaced axes defining equal angles with the vertical plane of symmetry of the aircraft part, and including tubular exhaust means located on opposite sides of said plane of symmetry coaxial with said axes of said jet engines, respectively, said jet engines being located in parallel planes perpendicular to said longitudinal axis; curved deflector nozzle means mounted on each of said exhaust means for turning movement between a lifting position for downwardly deflecting the jet streams discharged by said exhaust means and a propelling position for rearwardly deflecting said streams, each deflector nozzle means having a mounting portion engaged with said exhaust means and a discharge portion extending at an angle to said mounting portion, said last-mentioned angle being substantially equal to said first-mentioned angles so that the jet streams are discharged from said discharge portions in vertical directions in said lifting position, and in horizontal direction parallel to said horizontal axis in said propelling position; and operating means for turning each of said nozzle means independently of the other nozzle means, so that the substantially horizontally rearwardly deflected jet streams provide the sole means of propulsion in horizontal direction.

12. In combination with an aircraft part, at least one pair of jet engines mounted on said aircraft part and having angularly spaced axes passing through said longitudinal axis defining equal angles with the vertical plane of symmetry of the aircraft part, and including tubular exhaust means located on opposite sides of said plane of symmetry coaxial with said axes of said jet engines, respectively; curved deflector nozzle means mounted on each of said exhaust means for turning movement between a lifting position for downwardly deflecting the jet streams discharged by said exhaust means and a propelling position for rearwardly deflecting said streams, each deflector nozzle means having a mounting portion engaged with said exhaust means and a discharge portion extending at an angle to said mounting portion, said last-mentioned angle being substantially equal to said first-mentioned angles so that the jet streams are discharged from said discharge portions in vertical directions in said lifting position, and in horizontal direction in said propelling position; and operating means for turning each of said nozzle means independently of the other nozzle means, so that the substantially horizontally rearwardly deflected jet streams provide the sole means of propulsion in horizontal direction.

13. In combination with an aircraft part, having a longitudinal axis, first and second rows of jet engines mounted on said aircraft part, the axes of the engines of said first row and the axes of said engines of said second row being located in two intersecting planes defining equal angles with the vertical plane of symmetry of said aircraft part, and the axis of each engine being located in a plane transverse to said axis, said jet engines including tubular exhaust means forming first and second rows on opposite sides of said aircraft part; deflector nozzle means mounted on each of said exhaust means for turning movement between a lifting position for downwardly deflecting the jet stream discharged by said exhaust nozzle means and a propelling position for rearwardly deflecting said stream; and operating means connected to said deflector nozzles for turning the same, so that the substantially horizontally rearwardly deflected jet streams provide the sole means of propulsion in horizontal direction.

14. In combination with an aircraft part, having a longitudinal axis, first and second rows of jet engines mounted on said aircraft part, the axes of the engines of said first row and the axes of said engines of said second row being located in two intersecting planes defining equal angles with the vertical plane of symmetry of said aircraft part, and the axes of each engine being located in a plane transverse to said longitudinal axis, said jet engines including tubular exhaust means forming first and second rows on opposite sides of said aircraft part; deflector nozzle means mounted on each of said exhaust means for turning movement between a lifting position for downwardly deflecting the jet stream discharged by said exhaust nozzle means and a propelling position for rearwardly deflecting said stream, said deflector nozzle means forming first and second rows on opposite sides of said aircraft; and first operating means connected to said deflector nozzles of said first row and second operating means connected to said deflector nozzle means of said second row for independently turning the deflector nozzle means of each row between said lifting and propelling positions, so that the substantially horizontally rearwardly deflected jet streams provide the sole means of propulsion in horizontal direction.

15. In combination with an aircraft part, having a longitudinal axis, first and second rows of jet engines mounted on said aircraft part, the axes of the engines of said first row and the axes of said engines of said second row being located in two intersecting planes defining equal angles with the vertical plane of symmetry of said aircraft part, said jet engines of said first and second rows being alternately disposed in planes perpendicular to said longitudinal axis, said jet engines including tubular exhaust means forming first and second rows on opposite sides of said aircraft part; deflector nozzle means mounted on each of said exhaust means for turning movement between a lifting position for downwardly deflecting the jet stream discharged by said exhaust nozzle means and a propelling position for rearwardly deflecting said stream, said deflector nozzle means forming first and second rows on opposite sides of said aircraft; and first operating means connected to said deflector nozzles of said first row and second operating means connected to said deflector nozzle means of said second row for independently turning the deflector nozzle means of each row between said lifting and propelling positions, so that the substantially horizontally rearwardly deflected jet streams provide the sole means of propulsion in horizontal direction.

16. An aircraft as set forth in claim 15 wherein said first and second operating means each include a gear mounted on each deflector nozzle means, a pinion meshing with each gear, means connecting said pinions of each of said first and second rows of deflector nozzle means for rotation, and a drive motor for driving one pinion of each said row.

17. In combination with an aircraft part having a longitudinal axis, first and second rows of jet engines mounted on said aircraft part, the axes of the engines of said first row and the axes of said engines of said second row being located in two planes defining equal angles with the vertical plane of symmetry of said aircraft part and intersecting in said longitudinal axis of said aircraft part, said jet engines of said first and second rows being alternately disposed in planes perpendicular to said longitudinal axis, said jet engines including tubular exhaust means substantially coaxial with said axes of said jet engines and forming first and second rows on opposite sides of said aircraft part; deflector nozzle means mounted on each of said exhaust means for turning movement between a lifting position for downwardly deflecting the jet stream discharged by said exhaust nozzle means and a propelling position for rearwardly deflecting said stream, said deflector nozzle means forming first and second rows on opposite sides of said aircraft; and first operating means connected to said deflector nozzles of said first row and second operating means connected to said deflector nozzle means of said second row for independently turning the deflector nozzle means of each row between said lifting and propelling positions, so that the substantially horizontally rearwardly deflected jet streams provide the sole means of propulsion in horizontal direction.

18. In combination with an aircraft part having a longitudinal axis, first and second rows of jet engines mounted on said aircraft part, the axes of the engines of said first row and the axes of said engines of said second row being located in two planes defining equal angles between 45° and 60° with the vertical plane of symmetry of said aircraft part and intersecting in said longitudinal axis of said aircraft part, said jet engines of said first and second rows being alternately disposed in planes perpendicular to said longitudinal axis, said jet engines including tubular exhaust means substantially coaxial with said axes of said jet engines and forming first and second rows on opposite sides of said aircraft part; deflector nozzle means mounted on each of said exhaust means for turning movement between a lifting position for downwardly deflecting the jet stream discharged by said exhaust nozzle means and a propelling position for rearwardly deflecting said stream, said deflector nozzle means forming first and second rows on opposite sides of said aircraft; and first operating means connected to said deflector nozzles of said first row and second operating means connected to said deflector nozzle means of said second row for independently turning the deflector nozzle means of each row between said lifting and propelling positions, so that the substantially horizontally rearwardly deflected jet streams provide the sole means of propulsion in horizontal direction.

19. In combination with an aircraft part having a longitudinal axis, first and second rows of jet engines mounted on said aircraft part, the axes of the engines of said first row and the axes of said engines of said second row being located in two planes defining equal angles with the vertical plane of symmetry of said aircraft part and intersecting in said longitudinal axis of said aircraft part, said jet engines of said first and second rows being alternately disposed in planes perpendicular to said longitudinal axis, said jet engines including tubular exhaust means substantially coaxial with said axes of said jet engines and forming first and second rows on opposite sides of said aircraft part; deflector nozzle means mounted on each of said exhaust means for turning movement between a lifting position for downwardly deflecting the jet stream discharged by said exhaust nozzle means and a propelling position for rearwardly deflecting said stream, said deflector nozzle means forming first and second rows on opposite sides of said aircraft, said deflector nozzle means being curved and having a mounting portion mounted on said exhaust means and a discharge portion extending at an angle to said mounting portion, said last-mentioned angle being equal to said first mentioned angle; and first operating means connected to said deflector nozzles of said first row and second operating means connected to said deflector nozzle means of said second row for independently turning the deflector nozzle means of each row between said lifting and propelling positions, so that the substantially horizontally rearwardly deflected jet streams provide the sole means of propulsion in horizontal direction.

20. In combination with an aircraft part having a longitudinal axis, first and second rows of jet engines mounted on said aircraft part, the axes of the engines of said first row and the axes of said engines of said second row being located in two planes defining equal angles between 45° and 60° with the vertical plane of symmetry of said aircraft part and intersecting in said longitudinal axis of said aircraft part, said jet engines of said first and second rows being alternately disposed in planes perpendicular to said longitudinal axis, said jet engines including tubular exhaust means substantially coaxial with said axes of said jet engines and forming first and second rows on opposite sides of said aircraft part; deflector nozzle means mounted on each of said exhaust means for turning movement between a lifting position for downwardly deflecting the jet stream discharged by said exhaust nozzle means and a propelling position for rearwardly deflecting said stream, said deflector nozzle means forming first and second rows on opposite sides of said aircraft, said deflector nozzle means being curved and having a mounting portion mounted on said exhaust means and a discharge portion extending at an angle to said mounting portion, said last-mentioned angle being equal to said first mentioned angle; and first operating means including motor means connected to said deflector nozzles of said first row and second operating means including motor means connected to said deflector nozzle means of said second row for independently turning the deflector nozzle means of each row between said lifting and propelling positions, so that the substantially horizontally rearwardly deflected jet streams provide the sole means of propulsion in horizontal direction.

References Cited by the Examiner
UNITED STATES PATENTS

| | | | |
|---|---|---|---|
| 2,762,584 | 9/1956 | Price | 244—12 |
| 3,037,723 | 6/1962 | Taylor | 244—23 |
| 3,122,343 | 12/1964 | Leibach et al. | 244—23 |
| 3,174,707 | 3/1965 | Ricard | 244—12 |
| 3,193,217 | 7/1965 | Marchant et al. | 244—23 |
| 3,223,360 | 12/1965 | Hertel et al. | 244—23 |

MILTON BUCHLER, *Primary Examiner.*

L. C. HALL, A. E. CORRIGAN, *Assistant Examiners.*